(12) United States Patent
Zhong

(10) Patent No.: US 12,518,392 B2
(45) Date of Patent: Jan. 6, 2026

(54) TRAINING METHOD AND APPARATUS FOR MACHINE LEARNING MODEL, IMAGE PROCESSING METHOD AND APPARATUS

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Chuqian Zhong, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 392 days.

(21) Appl. No.: 18/042,700

(22) PCT Filed: Feb. 28, 2022

(86) PCT No.: PCT/CN2022/078338
§ 371 (c)(1),
(2) Date: Feb. 23, 2023

(87) PCT Pub. No.: WO2023/159581
PCT Pub. Date: Aug. 31, 2023

(65) Prior Publication Data
US 2024/0289960 A1    Aug. 29, 2024

(51) Int. Cl.
*G06T 7/00*    (2017.01)
*G06N 3/0464*    (2023.01)
*G06T 7/11*    (2017.01)

(52) U.S. Cl.
CPC .............. *G06T 7/11* (2017.01); *G06N 3/0464* (2023.01); *G06T 2207/20081* (2013.01)

(58) Field of Classification Search
CPC . G06T 7/11; G06T 2207/20081; G06T 7/194; G06T 2207/20084; G06N 3/0464; G06N 3/04; G06N 3/00; G06N 3/08
See application file for complete search history.

(56) References Cited

U.S. PATENT DOCUMENTS

| 12,092,732 B2 * | 9/2024 | Payton | .................... G01S 7/417 |
| 12,295,799 B2 * | 5/2025 | Liu | .......................... G06V 10/17 |

(Continued)

FOREIGN PATENT DOCUMENTS

| CN | 108122197 A | 6/2018 |
| CN | 109146788 A | 1/2019 |

(Continued)

OTHER PUBLICATIONS

Lim et al., "Enhanced Deep Residual Networks for Single Image Super-Resolution", Department of ECE, ASRI, Seoul National University, pp. 136-144.

(Continued)

*Primary Examiner* — Bobbak Safaipour
(74) *Attorney, Agent, or Firm* — DINSMORE & SHOHL LLP

(57) ABSTRACT

The present disclosure relates to a training method and training apparatus for a machine learning model, and a method and apparatus for image processing, which relates to the technical field of image processing. The training method for a machine learning model includes: expanding at least one pixel of an image sample to be processed into a pixel block, which comprises a plurality of pixels to be predicted; processing the pixel block using a first mask and obtain a mask processed result; according to the mask processed result, predicting prediction pixel values of the plurality of pixels to be predicted using a machine learning model; training a machine learning model according to the predic- (Continued)

tion pixel values of the plurality of pixels to be predicted and labeled pixel values of the plurality of pixels to be predicted.

18 Claims, 11 Drawing Sheets

(56) References Cited

U.S. PATENT DOCUMENTS

| | | | |
|---|---|---|---|
| 2021/0065337 A1 | 3/2021 | Bai | |
| 2022/0237418 A1* | 7/2022 | Heide | G06F 18/241 |
| 2023/0030419 A1* | 2/2023 | Wang | G06V 10/80 |
| 2023/0260110 A1* | 8/2023 | Wang | G06T 7/0012 |
| | | | 382/128 |
| 2023/0419646 A1* | 12/2023 | Han | G06N 3/0464 |
| 2024/0054640 A1* | 2/2024 | Zhao | G06T 3/4053 |

FOREIGN PATENT DOCUMENTS

| | | |
|---|---|---|
| CN | 111598779 A | 8/2020 |
| CN | 112446826 A | 3/2021 |
| JP | 2011070283 A | 4/2011 |
| WO | 2021061138 A1 | 4/2021 |

OTHER PUBLICATIONS

Salerno, "Image Super Resolution Using Deep Convolutional Networks", CS 445, Fall 2015, pp. 1-4.

Shen-Long et al, "Study on Reconstruction of Overall Image of License Plate", Nachang Aeronautical University, Nachang, China, pp. 1-6 <http://www.cnki.net>, doi: 10.3969 /j issn.673 629X.2019. 04.039.

Lu et al, "Transformer for Single Image Super-Resolution", Peking University Shenzhen Graduate School, The Chinese University of Hong Kong, Nanjing University of Posts and Telecommunications, pp. 1-10.

* cited by examiner

| (1,1) | mask | ... | mask | (1,2) | mask | ... | mask | ... | (1,n) | mask | ... | mask |
| mask | mask | ... | mask | mask | mask | ... | mask | ... | mask | mask | ... | mask |
| ⋮ | ⋮ | ⋱ | ⋮ | ⋮ | ⋮ | ⋱ | ⋮ | ⋱ | ⋮ | ⋮ | ⋱ | ⋮ |
| mask | mask | ... | mask | mask | mask | ... | mask | ... | mask | mask | ... | mask |
| (2,1) | mask | ... | mask | (2,2) | mask | ... | mask | ... | (2,n) | mask | ... | mask |
| mask | mask | ... | mask | mask | mask | ... | mask | ... | mask | mask | ... | mask |
| ⋮ | ⋮ | ⋱ | ⋮ | ⋮ | ⋮ | ⋱ | ⋮ | ⋱ | ⋮ | ⋮ | ⋱ | ⋮ |
| mask | mask | ... | mask | mask | mask | ... | mask | ... | mask | mask | ... | mask |
| ⋮ | ⋮ | ⋱ | ⋮ | ⋮ | ⋮ | ⋱ | ⋮ | ⋱ | ⋮ | ⋮ | ⋱ | ⋮ |
| (m,1) | mask | ... | mask | (m,2) | mask | ... | mask | ... | (m,n) | mask | ... | mask |
| mask | mask | ... | mask | mask | mask | ... | mask | ... | mask | mask | ... | mask |
| ⋮ | ⋮ | ⋱ | ⋮ | ⋮ | ⋮ | ⋱ | ⋮ | ⋱ | ⋮ | ⋮ | ⋱ | ⋮ |
| mask | mask | ... | mask | mask | mask | ... | mask | ... | mask | mask | ... | mask |

FIG. 2a

| (1,1) | $mask_{1,2}$ | ... | $mask_{1,N}$ | (1,2) | $mask_{1,2}$ | ... | $mask_{1,N}$ | ... | (1,n) | $mask_{1,2}$ | ... | $mask_{1,N}$ |
| $mask_{2,1}$ | $mask_{2,2}$ | ... | $mask_{2,N}$ | $mask_{2,1}$ | $mask_{2,2}$ | ... | $mask_{2,N}$ | ... | $mask_{2,1}$ | $mask_{2,2}$ | ... | $mask_{2,N}$ |
| ⋮ | ⋮ | ⋱ | ⋮ | ⋮ | ⋮ | ⋱ | ⋮ | ⋱ | ⋮ | ⋮ | ⋱ | ⋮ |
| $mask_{N,1}$ | $mask_{N,2}$ | ... | $mask_{N,N}$ | $mask_{N,1}$ | $mask_{N,2}$ | ... | $mask_{N,N}$ | ... | $mask_{N,1}$ | $mask_{N,2}$ | ... | $mask_{N,N}$ |
| (2,1) | $mask_{1,2}$ | ... | $mask_{1,N}$ | (2,2) | $mask_{1,2}$ | ... | $mask_{1,N}$ | ... | (2,n) | $mask_{1,2}$ | ... | $mask_{1,N}$ |
| $mask_{2,1}$ | $mask_{2,2}$ | ... | $mask_{2,N}$ | $mask_{2,1}$ | $mask_{2,2}$ | ... | $mask_{2,N}$ | ... | $mask_{2,1}$ | $mask_{2,2}$ | ... | $mask_{2,N}$ |
| ⋮ | ⋮ | ⋱ | ⋮ | ⋮ | ⋮ | ⋱ | ⋮ | ⋱ | ⋮ | ⋮ | ⋱ | ⋮ |
| $mask_{N,1}$ | $mask_{N,2}$ | ... | $mask_{N,N}$ | $mask_{N,1}$ | $mask_{N,2}$ | ... | $mask_{N,N}$ | ... | $mask_{N,1}$ | $mask_{N,2}$ | ... | $mask_{N,N}$ |
| ⋮ | ⋮ | ⋱ | ⋮ | ⋮ | ⋮ | ⋱ | ⋮ | ⋱ | ⋮ | ⋮ | ⋱ | ⋮ |
| (m,1) | $mask_{1,1}$ | ... | $mask_{1,N}$ | (m,2) | $mask_{1,1}$ | ... | $mask_{1,N}$ | ... | (m,n) | $mask_{1,1}$ | ... | $mask_{1,N}$ |
| $mask_{2,1}$ | $mask_{2,2}$ | ... | $mask_{2,N}$ | $mask_{2,1}$ | $mask_{2,2}$ | ... | $mask_{2,N}$ | ... | $mask_{2,1}$ | $mask_{2,2}$ | ... | $mask_{2,N}$ |
| ⋮ | ⋮ | ⋱ | ⋮ | ⋮ | ⋮ | ⋱ | ⋮ | ⋱ | ⋮ | ⋮ | ⋱ | ⋮ |
| $mask_{N,1}$ | $mask_{N,2}$ | ... | $mask_{N,N}$ | $mask_{N,1}$ | $mask_{N,2}$ | ... | $mask_{N,N}$ | ... | $mask_{N,1}$ | $mask_{N,2}$ | ... | $mask_{N,N}$ |

FIG. 2b

| (1,1) | $mask_{1,1}$ | ... | $mask_{1,1}$ | (1,2) | $mask_{1,2}$ | ... | $mask_{1,2}$ | ... | (1,n) | $mask_{1,n}$ | ... | $mask_{1,n}$ |
|---|---|---|---|---|---|---|---|---|---|---|---|---|
| $mask_{1,1}$ | $mask_{1,1}$ | ... | $mask_{1,1}$ | $mask_{1,2}$ | $mask_{1,2}$ | ... | $mask_{1,2}$ | ... | $mask_{1,n}$ | $mask_{1,n}$ | ... | $mask_{1,n}$ |
| ⋮ | ⋮ | ⋱ | ⋮ | ⋮ | ⋮ | ⋱ | ⋮ | ⋱ | ⋮ | ⋮ | ⋱ | ⋮ |
| $mask_{1,1}$ | $mask_{1,1}$ | ... | $mask_{1,1}$ | $mask_{1,2}$ | $mask_{1,2}$ | ... | $mask_{1,2}$ | ... | $mask_{1,n}$ | $mask_{1,n}$ | ... | $mask_{1,n}$ |
| (2,1) | $mask_{2,1}$ | ... | $mask_{2,1}$ | (2,1) | $mask_{2,1}$ | ... | $mask_{2,1}$ | ... | (2,n) | $mask_{2,n}$ | ... | $mask_{2,n}$ |
| $mask_{2,1}$ | $mask_{2,1}$ | ... | $mask_{2,1}$ | $mask_{2,1}$ | $mask_{2,1}$ | ... | $mask_{2,1}$ | ... | $mask_{2,n}$ | $mask_{2,n}$ | ... | $mask_{2,n}$ |
| ⋮ | ⋮ | ⋱ | ⋮ | ⋮ | ⋮ | ⋱ | ⋮ | ⋱ | ⋮ | ⋮ | ⋱ | ⋮ |
| $mask_{2,1}$ | $mask_{2,1}$ | ... | $mask_{2,1}$ | $mask_{2,1}$ | $mask_{2,1}$ | ... | $mask_{2,1}$ | ... | $mask_{2,n}$ | $mask_{2,n}$ | ... | $mask_{2,n}$ |
| ⋮ | ⋮ | ⋱ | ⋮ | ⋮ | ⋮ | ⋱ | ⋮ | ⋱ | ⋮ | ⋮ | ⋱ | ⋮ |
| (m,1) | $mask_{m,1}$ | ... | $mask_{m,1}$ | (m,2) | $mask_{m,2}$ | ... | $mask_{m,2}$ | ... | (m,n) | $mask_{m,n}$ | ... | $mask_{m,n}$ |
| $mask_{m,1}$ | $mask_{m,1}$ | ... | $mask_{m,1}$ | $mask_{m,2}$ | $mask_{m,2}$ | ... | $mask_{m,2}$ | ... | $mask_{m,n}$ | $mask_{m,n}$ | ... | $mask_{m,n}$ |
| ⋮ | ⋮ | ⋱ | ⋮ | ⋮ | ⋮ | ⋱ | ⋮ | ⋱ | ⋮ | ⋮ | ⋱ | ⋮ |
| $mask_{m,1}$ | $mask_{m,1}$ | ... | $mask_{m,1}$ | $mask_{m,2}$ | $mask_{m,2}$ | ... | $mask_{m,2}$ | ... | $mask_{m,n}$ | $mask_{m,n}$ | ... | $mask_{m,n}$ |

FIG. 2c

| (1,1) | $mask11_{1,2}$ | ... | $mask11_{1,N}$ | (1,2) | $mask12_{1,2}$ | ... | $mask12_{1,N}$ | ... | (1,n) | $mask1n_{1,2}$ | ... | $mask1n_{1,N}$ |
|---|---|---|---|---|---|---|---|---|---|---|---|---|
| $mask11_{2,1}$ | $mask11_{2,2}$ | ... | $mask11_{2,N}$ | $mask12_{2,1}$ | $mask12_{2,2}$ | ... | $mask12_{2,N}$ | ... | $mask1n_{2,1}$ | $mask1n_{2,2}$ | ... | $mask1n_{2,N}$ |
| ⋮ | ⋮ | ⋱ | ⋮ | ⋮ | ⋮ | ⋱ | ⋮ | ⋱ | ⋮ | ⋮ | ⋱ | ⋮ |
| $mask11_{N,1}$ | $mask11_{N,2}$ | ... | $mask11_{N,N}$ | $mask12_{N,1}$ | $mask12_{N,2}$ | ... | $mask12_{N,N}$ | ... | $mask1n_{N,1}$ | $mask1n_{N,2}$ | ... | $mask1n_{N,N}$ |
| (2,1) | $mask21_{1,2}$ | ... | $mask21_{1,N}$ | (2,2) | $mask22_{1,2}$ | ... | $mask22_{1,N}$ | ... | (2,n) | $mask2n_{1,2}$ | ... | $mask2n_{1,N}$ |
| $mask21_{2,1}$ | $mask21_{2,2}$ | ... | $mask21_{2,N}$ | $mask22_{2,1}$ | $mask22_{2,2}$ | ... | $mask22_{2,N}$ | ... | $mask2n_{2,1}$ | $mask2n_{2,2}$ | ... | $mask2n_{2,N}$ |
| ⋮ | ⋮ | ⋱ | ⋮ | ⋮ | ⋮ | ⋱ | ⋮ | ⋱ | ⋮ | ⋮ | ⋱ | ⋮ |
| $mask21_{N,1}$ | $mask21_{N,2}$ | ... | $mask21_{N,N}$ | $mask22_{N,1}$ | $mask22_{N,2}$ | ... | $mask22_{N,N}$ | ... | $mask2n_{N,1}$ | $mask2n_{N,2}$ | ... | $mask2n_{N,N}$ |
| ⋮ | ⋮ | ⋱ | ⋮ | ⋮ | ⋮ | ⋱ | ⋮ | ⋱ | ⋮ | ⋮ | ⋱ | ⋮ |
| (m,1) | $maskm1_{1,2}$ | ... | $maskm1_{1,N}$ | (m,2) | $maskm2_{1,2}$ | ... | $maskm2_{1,N}$ | ... | (m,n) | $maskmn_{1,1}$ | ... | $maskmn_{1,N}$ |
| $maskm1_{2,1}$ | $maskm1_{2,2}$ | ... | $maskm1_{2,N}$ | $maskm2_{2,1}$ | $maskm2_{2,2}$ | ... | $maskm2_{2,N}$ | ... | $maskmn_{2,1}$ | $maskmn_{2,2}$ | ... | $maskmn_{2,N}$ |
| ⋮ | ⋮ | ⋱ | ⋮ | ⋮ | ⋮ | ⋱ | ⋮ | ⋱ | ⋮ | ⋮ | ⋱ | ⋮ |
| $maskm1_{N,1}$ | $maskm1_{N,2}$ | ... | $maskm1_{N,N}$ | $maskm2_{N,1}$ | $maskm2_{N,2}$ | ... | $maskm2_{N,N}$ | ... | $maskmn_{N,1}$ | $maskmn_{N,2}$ | ... | $maskmn_{N,N}$ |

FIG. 2d

| | $N^2-1$ | | | | $N^2-1$ | | | | $N^2-1$ | | |
|---|---|---|---|---|---|---|---|---|---|---|---|
| 0 | $-\infty$ | ... | $-\infty$ | 0 | $-\infty$ | ... | $-\infty$ | ... | 0 | $-\infty$ | ... | $-\infty$ |
| 0 | $-\infty$ | ... | $-\infty$ | 0 | $-\infty$ | ... | $-\infty$ | ... | 0 | $-\infty$ | ... | $-\infty$ |
| ⋮ | | | | | | | | | | | | |
| 0 | $-\infty$ | ... | $-\infty$ | 0 | $-\infty$ | ... | $-\infty$ | ... | 0 | $-\infty$ | ... | $-\infty$ |
| 0 | $-\infty$ | ... | $-\infty$ | 0 | $-\infty$ | ... | $-\infty$ | ... | 0 | $-\infty$ | ... | $-\infty$ |
| 0 | $-\infty$ | ... | $-\infty$ | 0 | $-\infty$ | ... | $-\infty$ | ... | 0 | $-\infty$ | ... | $-\infty$ |

FIG. 3a

| | $N^2-1$ | | | | $N^2-1$ | | | | $N^2-1$ | | |
|---|---|---|---|---|---|---|---|---|---|---|---|
| 0 | $-\infty$ | ... | $-\infty$ | 0 | $-\infty$ | ... | $-\infty$ | ... | 0 | $-\infty$ | ... | $-\infty$ |
| 0 | 0 | ... | $-\infty$ | 0 | $-\infty$ | ... | $-\infty$ | ... | 0 | $-\infty$ | ... | $-\infty$ |
| ⋮ | ⋮ | ⋮ | ⋮ | ⋮ | ⋮ | ⋮ | ⋮ | ⋮ | ⋮ | ⋮ | ⋮ | ⋮ |
| 0 | $-\infty$ | ... | $-\infty$ | 0 | $-\infty$ | ... | $-\infty$ | ... | 0 | $-\infty$ | ... | $-\infty$ |
| 0 | $-\infty$ | ... | $-\infty$ | 0 | $-\infty$ | ... | $-\infty$ | ... | 0 | $-\infty$ | ... | $-\infty$ |
| 0 | $-\infty$ | ... | $-\infty$ | 0 | $-\infty$ | ... | $-\infty$ | ... | 0 | $-\infty$ | ... | 0 |

FIG. 3b

TRAINING METHOD AND APPARATUS FOR MACHINE LEARNING MODEL, IMAGE PROCESSING METHOD AND APPARATUS

TECHNICAL FIELD

The present disclosure is a U.S. National Stage Application under 35 U.S.C. § 371 of International Patent Application No. PCT/CN2022/078338, filed on Feb. 28, 2022, the disclosure of which is hereby incorporated into this disclosure by reference in its entirety.

The present disclosure relates to the technical field of image processing, in particular to a training method for a machine learning model, a training apparatus for a machine learning model, an image processing method, an image processing apparatus, an electronic device, and a non-transitory computer-readable storage medium.

BACKGROUND

Super Resolution (SR) technology improves the resolution of original images through hardware or software methods. The process of obtaining a high-resolution image from a series of low resolution images is called super-resolution reconstruction, which has important application value in many fields.

In the related art, the up-sampling technology is used to achieve super-resolution processing of images.

SUMMARY

According to some embodiments of the present disclosure, a training method for a machine learning model is provided, comprising: expanding at least one pixel of an image sample to be processed into a pixel block, which comprises a plurality of pixels to be predicted; processing the pixel block using a first mask and obtain a mask processed result; according to the mask processed result, predicting prediction pixel values of the plurality of pixels to be predicted using a machine learning model; training a machine learning model according to the prediction pixel values of the plurality of pixels to be predicted and labeled pixel values of the plurality of pixels to be predicted.

In some embodiments, predicting prediction pixel values of the plurality of pixels to be predicted using a machine learning model comprises: extracting a self attention feature of the pixel block using a self attention module of the machine learning model; predicting the prediction pixel values according to the self attention feature of the pixel block using the machine learning model.

In some embodiments, extracting a self attention feature of the pixel block using a self attention module of the machine learning model comprises: using the self attention module, calculating a first self-attention correlation tensor of each of the pixels to be predicted; processing the first self-attention correlation tensor using a second mask to determine a second self-attention correlation tensor, wherein each of the pixels to be predicted do not learn relevant information of a designated pixel of the pixels to be predicted; according to the second self-attention correlation tensor, extracting a self attention feature using the self attention module.

In some embodiments, calculating a first self-attention correlation tensor of each of the pixels to be predicted using the self attention module comprises: extracting a query vector and a key vector of each of the pixels to be predicted using the self attention module; calculating the first self-attention correlation tensor according to the query vector and the key vector; processing the first self-attention correlation tensor using a second mask to determine a second self-attention correlation tensor comprises: processing the first self-attention correlation tensor using the second mask to determine the second self-attention correlation tensor, so that the influence of each of the pixels to be predicted on a designated pixel of the pixels to be predicted is less than a first threshold.

In some embodiments, the above at least one pixel is a seed pixel, and the second self-attention correlation tensor causes that each of the pixels to be predicted only learn information of the seed pixel, or each of the pixels to be predicted learn information thereof and information of the seed pixel, or the seed pixel can learn information of each of the pixels to be predicted, and each of the pixels to be predicted only learn information of the seed pixel, or the seed pixel can learn information of each of the pixels to be predicted, and each of the pixels to be predicted only learn its own information and information of the seed pixel.

In some embodiments, processing the first self-attention correlation tensor using a second mask to determine a second self-attention correlation tensor comprises: determining the second self-attention correlation tensor according to a sum of the second mask and the first self-attention correlation tensor, wherein an element corresponding to a first relevant relationship in the second mask is 0, and an element corresponding to a second relevant relationship is less than a second threshold, the first relevant relationship being a relevant relationship between each of the pixels to be predicted and at least one element, and the second relevant relationship being a relevant relationship between each of the pixels to be predicted and a designated pixel of the pixels to be predicted.

In some embodiments, elements of a $1+n \times N^2$ column of the second mask are zero, and the other elements of the second mask are less than the second threshold, wherein n is 0 or a positive integer, N is a multiple of resolution of the processed image sample which is obtained according to the prediction pixel values to resolution of the image sample to be processed; or the elements of a $1+n \times N^2$ column of the second mask are zero, the diagonal elements of the second mask is 0, and the other elements of the second mask are less than the second threshold; or the elements of a $1+n \times N^2$ column of the second mask are zero, the elements of $1+n \times N^2$ row of the second mask are zero, and other elements of the second mask are less than the second threshold; or the elements of a $1+n \times N^2$ column of the second mask are zero, the elements of $1+n \times N^2$ row of the second mask are zero, the diagonal elements of the second mask are 0, and the other elements of the second mask are less than the second threshold.

In some embodiments, extracting a self attention feature of the pixel block using a self attention module of the machine learning model comprises: if the number of training round is less than a round threshold, extracting the self attention feature using the self attention module according to the second self-attention correlation tensor; if the number of training round is greater than or equal to the round threshold, extracting the self attention feature using the self attention module according to the first self-attention correlation tensor.

In some embodiments, predicting prediction pixel values of a plurality of pixels to be predicted in the pixel block using the machine learning model comprises: performing embedding representation processing on the pixel block using the machine learning model to generate a first embedded feature tensor; extracting feature information of the pixel block using the machine learning model according to the first embedded feature tensor; predicting prediction pixel values using the machine learning model according to the feature information of the pixel block.

In some embodiments, extracting feature information of the pixel block using the machine learning model according to the first embedded feature tensor comprises: performing position encoding on pixels in the image sample to be processed to generate a position encoding tensor; generating the second embedded feature tensor according to the position encoding tensor and the first embedded feature tensor; extracting feature information of the pixels in the image sample to be processed using the machine learning model according to the second embedded feature tensor.

In some embodiments, performing position encoding for the first embedded feature tensor to generate a position encoding tensor comprises: dividing the first embedded feature tensor into a plurality of embedded feature sub-tensors according to different directions; performing position encoding for the plurality of embedded feature sub-tensors respectively to generate a plurality of position encoded tensors.

In some embodiments, expanding at least one pixel of an image sample to be processed into a pixel block comprises: dividing the image sample to be processed into a plurality of sub-images; expanding at least one pixel of the plurality of sub-images into a pixel block.

In some embodiments, dividing the image sample to be processed into a plurality of sub-images comprises: dividing the image to be processed into a plurality of image blocks; for different image channels, dividing each of the plurality of image blocks into a plurality of sub-images.

In some embodiments, different pixel blocks are processed using the same first mask having identical mask values; or different pixel blocks are processed using the same first mask having different mask values, or different pixel blocks are processed using different first masks each having identical mask values, or different pixel blocks are processed using different first masks each having different mask values.

According to other embodiments of the present disclosure, there is provided an image processing method, comprising: expanding at least one pixel of an image sample to be processed into a pixel block, which comprises a plurality of pixels to be predicted; processing the pixel block using a first mask to obtain a mask processed result; according to the mask processed result, predicting prediction pixel values of the plurality of pixels to be predicted in the pixel block using a machine learning model to obtain a processed image sample, wherein the machine learning model is trained using the training method of any of the embodiments described above.

According to still other embodiments of the present disclosure, there is provided an training apparatus for a machine learning model, comprising: an expansion unit for expanding at least one pixel of an image sample to be processed into a pixel block, which comprises a plurality of pixels to be predicted, and processing the pixel block using a first mask to obtain a mask processed result; a prediction unit for, according to the mask processed result, predicting prediction pixel values of the plurality of pixels to be predicted in the pixel block using a machine learning model to obtain a processed image sample; a training unit for training a machine learning model according to the prediction pixel values of the plurality of pixels to be predicted and labeled pixel values of the plurality of pixels to be predicted.

In some embodiments, the prediction unit is configured for extracting a self attention feature of the pixel block using a self attention module of the machine learning model; predicting the prediction pixel values according to the self attention feature of the pixel block using the machine learning model.

In some embodiments, the prediction unit is configured for calculating a first self-attention correlation tensor of each of the pixels to be predicted using the self attention module; processing the first self-attention correlation tensor using a second mask to determine a second self-attention correlation tensor, wherein each of the pixels to be predicted do not learn relevant information of a designated pixel of the pixels to be predicted; according to the second self-attention correlation tensor, extracting a self attention feature using the self attention module.

In some embodiments, the prediction unit is configured for extracting a query vector and a key vector of each of the pixels to be predicted using the self attention module; calculating the first self-attention correlation tensor according to the query vector and the key vector; processing the first self-attention correlation tensor using a second mask to determine a second self-attention correlation tensor comprises: processing the first self-attention correlation tensor using the second mask to determine the second self-attention correlation tensor, so that the influence of each of the pixels to be predicted on a designated pixel of the pixels to be predicted is less than a first threshold.

In some embodiments, the above at least one pixel is a seed pixel, and the second self-attention correlation tensor makes each of the pixels to be predicted only learn information of the seed pixel, or each of the pixels to be predicted learn information thereof and information of the seed pixel, or the seed pixel can learn information of each of the pixels to be predicted, and each of the pixels to be predicted only learn information of the seed pixel, or the seed pixel can learn information of each of the pixels to be predicted, and each of the pixels to be predicted only learn its own information and information of the seed pixel.

In some embodiments, the prediction unit is configured for determining the second self-attention correlation tensor according to a sum of the second mask and the first self-attention correlation tensor, wherein an element corresponding to a first relevant relationship in the second mask is 0, and an element corresponding to a second relevant relationship is less than a second threshold, the first relevant relationship being a relevant relationship between each of the pixels to be predicted and at least one element, and the second relevant relationship being a relevant relationship between each of the pixels to be predicted and a designated pixel of the pixels to be predicted.

In some embodiments, the elements of a $1+n \times N^2$ column of the second mask are zero, and the other elements of the second mask are less than the second threshold, wherein n is 0 or a positive integer, N is a multiple of resolution of the processed image sample to resolution of the image sample to be processed; or the elements of a $1+n \times N^2$ column of the second mask are zero, the diagonal elements of the second mask are 0, and the other elements of the second mask are less than the second threshold; or the elements of a $1+n \times N^2$ column of the second mask are zero, the elements of $1+n \times N^2$ row of the second mask are zero, and other elements of the second mask are less than the second threshold; or the elements of a $1+n \times N^2$ column of the second mask are zero, the elements of $1+n \times N^2$ row of the second mask are zero, the diagonal elements of the second mask are 0, and the other elements of the second mask are less than the second threshold.

In some embodiments, the prediction unit is configured for, if the number of training round is less than a round threshold, extracting the self attention feature using the self attention module according to the second self-attention correlation tensor; if the number of training round is greater than or equal to the round threshold, extracting the self attention feature using the self attention module according to the first self-attention correlation tensor.

In some embodiments, the prediction unit is configured for performing embedding representation processing on the pixel block using the machine learning model to generate a first embedded feature tensor; extracting feature information of the pixel block using the machine learning model according to the first embedded feature tensor; predicting prediction pixel values using the machine learning model according to the feature information of the pixel block.

In some embodiments, the prediction unit is configured for performing position encoding on pixels in the image sample to be processed to generate a position encoding tensor; generating the second embedded feature tensor according to the position encoding tensor and the first embedded feature tensor; extracting feature information of the pixels in the image sample to be processed using the machine learning model according to the second embedded feature tensor.

In some embodiments, the prediction unit is configured for dividing the first embedded feature tensor into a plurality of embedded feature sub-tensors according to different directions; performing position encoding for the plurality of embedded feature sub-tensors respectively to generate a plurality of position encoded tensors.

In some embodiments, the expansion unit is configured for dividing the image sample to be processed into a plurality of sub-images; expanding at least one pixel of the plurality of sub-images into a pixel block.

In some embodiments, the expansion unit is configured for dividing the image to be processed into a plurality of image blocks; for different image channels, dividing each of the plurality of image blocks into a plurality of sub-images.

In some embodiments, different pixel blocks are processed using the same first mask having identical mask values; or different pixel blocks are processed using the same first mask having different mask values, or different pixel blocks are processed using different first masks each having identical mask values, or different pixel blocks are processed using different first masks each having different mask values.

According to still other embodiments of the present disclosure, there is provided an image processing apparatus, comprising: an expansion unit for expanding at least one pixel of an image sample to be processed into a pixel block, which comprises a plurality of pixels to be predicted, and processing the pixel block using a first mask to obtain a mask processed result; a prediction unit for, according to the mask processed result, predicting prediction pixel values of the plurality of pixels to be predicted in the pixel block using a machine learning model to obtain a processed image sample, wherein the machine learning model is trained using the training method of any of the embodiments described above.

According to further embodiments of the present disclosure, there is provided an electronic device comprising: memory; a processor coupled to the memory, the processor configured to, based on instructions stored in the memory, carry out the training method for a machine learning model or the image processing method of any of the above embodiments.

According to still other embodiments of the present disclosure, there is provided a non-transitory computer readable storage medium having stored thereon a computer program that, when executed by a processor, implements the training method for a machine learning model or the image processing method of any one of the above embodiments.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof. In the drawings:

FIGS. 2a to 2e show schematic diagrams of the method of training a machine learning model according to some embodiments of the present disclosure;

FIGS. 3a to 3d show schematic diagrams of the second mask according to some embodiments of the present disclosure;

DETAILED DESCRIPTION

Figure 1:
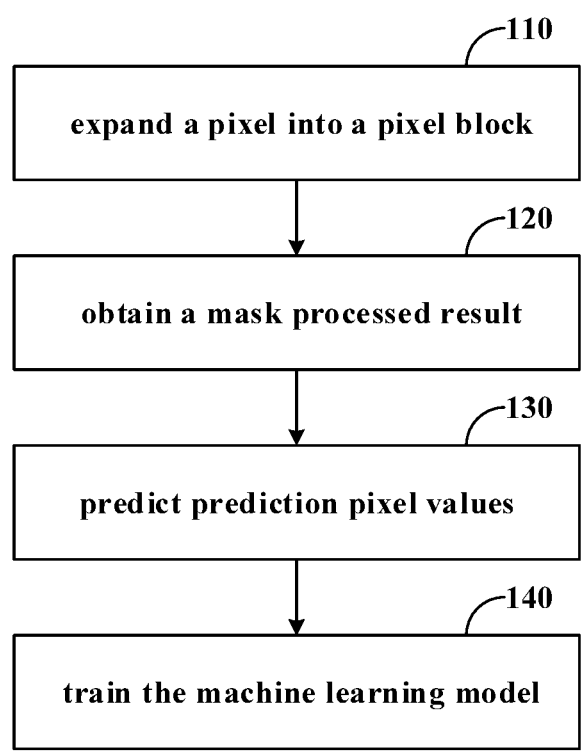
FIG. 1 shows a flowchart of a training method for a machine learning model according to some embodiments of the present disclosure.

Various exemplary embodiments of the present disclosure will now be described in detail with reference to the accompanying drawings. Notice that, Unless otherwise specified, the relative arrangement, numerical expressions and numerical values of the components and steps set forth in these examples do not limit the scope of the invention.

At the same time, it should be understood that, for ease of description, the dimensions of the various parts shown in the drawings are not drawn to actual proportions.

The following description of at least one exemplary embodiment is in fact merely illustrative and is in no way intended as a limitation to the invention, its application or use.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an article is defined in a drawing, there is no need for further discussion in the accompanying drawings.

The inventors of the present disclosure have found the following problems existed in the related art: when predicting pixel values of a super-resolution image, it is impossible to learn information outside the receptive field; moreover, the up-sampling process is not a learning process, resulting in degraded performance of super-resolution processing of images.

In view of this, the present disclosure proposes a technical solution for training a machine learning model, which can improve the performance of super-resolution processing of images.

For the above technical problems, the present disclosure can accomplish the task of super-resolution by the following embodiments. An image is divided into a plurality of image blocks, and the image to be processed is filled with pixels to be predicted to a size equal to that of the image after super-resolution processing; A machine learning model is used to extract image features while achieving up-sampling.

In this way, by filling a low resolution image with pixels to be predicted, a machine learning model is used to combine the feature extraction and up-sampling steps, the technical problem that information outside the receptive field cannot be learned can be solved, resulting in better effect of image super-resolution processing. For example, the technical solution of the present disclosure can be realized through the following embodiments.

FIG. 1 shows a flowchart of some embodiments of a training method for a machine learning model of the present disclosure.

As shown in FIG. 1, in step 110, at least one pixel of an image sample to be processed is expanded into a pixel block. The pixel block comprises a plurality of pixels to be predicted. In some embodiments, a pixel can be expanded according to the resolution of the image to be processed and a desired resolution to generate an expanded image. The size of the expanded image is the same as that of the image corresponding to the desired resolution.

In step 120, the pixel block is processed using a first mask to obtain a mask processed result.

In some embodiments, each pixel in the image to be processed can be used as a seed pixel, and initial values can be assigned to various pixels to be predicted according to a position of the seed pixel in the first mask and the relationship between the mask values in the first mask. The seed pixel may be located at any position in the pixel block.

FIGS. 2a to 2e show schematic diagrams of a training method for a machine learning model according to some embodiments of the present disclosure.

In some embodiments, the seed pixel learn information thereof, and each of the pixels to be predicted only learn information of the seed pixel. For example, the seed pixel is located at row 1 and column 1 of each pixel block, and different pixel blocks are processed using the same first mask having identical mask values.

As shown in FIG. 2a, the size of the image to be processed is m×n. The size of the first mask is N×N. N is a multiple of resolution of the processed image sample to resolution of the image sample to be processed. The seed pixel is located at row 1 and column 1 in the first mask, and all mask values are identical (all are masks).

In some embodiments, the seed pixel learn information thereof, and each of the pixels to be predicted learn information thereof and the information of the seed pixel. For example, the seed pixel is located at row 1 and column 1 of each pixel block, and different pixel blocks are processed using the same first mask having different mask values.

As shown in FIG. 2b, all seed pixels share a first mask of N×N. The seed pixel is located at row 1 and column 1 in the first mask, and the mask values at different positions are different from each other ($mask_{i,j}$, i=1, 2 ... N, j=1, 2 ... N).

In some embodiments, the seed pixel can learn information of each of the pixels to be predicted, and each of the pixels to be predicted only learn information of the seed pixel. For example, the seed pixel is located at row 1 and column 1 of each pixel block, and different pixel blocks are processed using different first masks each having identical mask values.

As shown in FIG. 2c, different first masks of N×N are used for different seed pixels. The seed pixel in each first mask is located at row 1 and column 1, and the mask values at different positions are identical, but the pixel values of pixels to be predicted in different first masks are different. For example, the pixel value in the first mask corresponding to the seed pixel (1, 1) is $mask_{1,1}$, and the pixel value in the first mask corresponding to the seed pixel (1, n) is $mask_{1,n}$.

In some embodiments, the seed pixel can learn information of each of the pixels to be predicted, and each of the pixels to be predicted only learn its own information and the information of the seed pixel. For example, the seed pixel is located at row 1 and column 1 of each pixel block, and different pixel blocks are processed using different first masks each having different mask values.

As shown in FIG. 2d, different first masks of N×N are used for different seed pixels. The seed pixel is located at row 1 and column 1 in each first mask, and the mask values at different positions are different from each other. The pixel values in the first mask corresponding to the seed pixel (1, 1) are $mask11_{i,j}$, i=1,2 ... N, j=1,2 ... N, and the pixel values in the first mask corresponding to the seed pixel (1, n) are $mask1n_{i,j}$.

In some embodiments, the image sample to be processed is divided into a plurality of sub-images; At least one pixel of the plurality of sub-images is expanded into a pixel block.

In some embodiments, an image to be processed is divided into a plurality of image blocks; for different image channels, each of the plurality of image blocks is divided into a plurality of sub-images. For example, the division of sub-images can be realized by the embodiment in FIG. 2a.

Figure 2E:
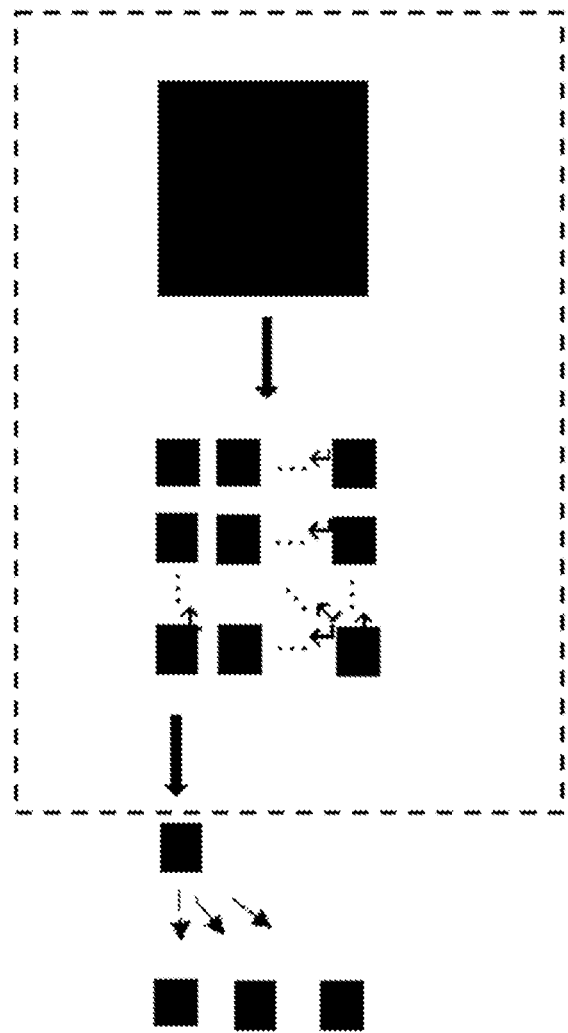

As shown in FIG. 2e, an image to be processed is divided into a plurality of image blocks; for an image block, sub-images are generated on R (red), G (green) and B (blue) channels respectively for subsequent processing.

In some embodiments, instead of dividing an image to be processed into a plurality of image blocks, the whole image to be processed can be divided into sub-images of three channels for subsequent processing.

In this way, the image to be processed is divided into smaller sub-images for subsequent processing, enabling the machine learning model to learn less useless information and require fewer computing resources, and thus improving processing efficiency.

In step 130, prediction pixel values of a plurality of pixels to be predicted are predicted using a machine learning model to obtain a processed image sample.

In some embodiments, a self attention module of the machine learning model is used to extract a self attention feature of the pixel block; prediction pixel values are predicted using the machine learning model according to the self attention feature of the pixel block.

In some embodiments, the pixel block can be expanded into a one-dimensional vector, and then embedding representation processing can be performed to obtain a first embedded feature tensor. For example, it is also possible to directly perform embedding representation processing without expansion of the pixel block.

For example, if the pixel block is expanded into a one-dimensional vector, embedding representation processing can be performed on each pixel in the expanded image, so as to obtain an embedded feature tensor. If the embedding dimension is D, an embedded feature tensor of mn×D can be obtained. The embedded feature tensor is into the self attention module of the Encoder of the Transformer model to extract a self attention feature of mn×D.

In some embodiments, the Encoder can comprise a multi-head self attention module and a feedforward neural network module. The multi-head self attention module can extract multiple sets of feature vectors composed of a Query vector, a Key vectors and a Value vector, and then obtain multi-head self attention features; the multi-head self attention features can be merged into a final self attention feature.

For example, for each head, the embedded feature tensor undergoes three linear transformations to generate a Query vector, a Key vector, and a Value vector; the Query vector of each pixel is multiplied by transposition thereon and transposition of Key vectors of other pixels to calculate a self-attention correlation tensor of each pixel; the self-attention correlation tensor of each pixel is divided by $\sqrt{d}$ and then is processed by the softmax function, wherein d is the number of dimensions of the Key vector; the softmax processing result of each pixel is multiplied by the value vectors of the pixel and other pixels respectively, and the products are summed up; according to the sum result, a self attention feature of each pixel is determined.

In some embodiments, a first self-attention correlation tensor of each of the pixels to be predicted is calculated using a self attention module; the first self-attention correlation tensor is processed using a second mask to determine a second self-attention correlation tensor, so that each of the pixels to be predicted cannot learn relevant information of a designated pixel of the pixels to be predicted; according to the second self-attention correlation tensor, a self attention feature is extracted using the self attention module.

In the above embodiment, a fact is taken into account that, in the training process, the initial prediction values of pixels to be predicted are randomly initialized, which do not contain useful information, and may affect the learning effect of other pixels to be predicted. Through setting a second mask, instead of learning the useless information of other pixels to be predicted in this stage, the pixels to be predicted can learn useful information of the seed pixel, thereby improving the super-resolution processing performance.

In some embodiments, a Query vector and a Key vector are extracted for each of the pixels to be predicted using the self attention module; the first self-attention correlation tensor is calculated according to the Query vector and the Key vector; the first self-attention correlation tensor is processed using the second mask to determine the second self-attention correlation tensor, so that the influence of the Query vector of each of the pixels to be predicted on the Key vector of a designated pixel of the pixels to be predicted is less than a first threshold.

For example, the first self-attention correlation tensor is processed using the second mask to determine a second self-attention correlation tensor; after softmax processing of the second self-attention correlation tensor, the influence of each of the pixels to be predicted on a designated pixel of the pixels to be predicted is 0.

For example, after softmax processing of the first self-attention correlation tensor processed using the second mask, a second self-attention correlation tensor is obtained.

For example, the second mask also makes the element in the second self-attention correlation tensor that characterizes the influence of the Query vector of each of the pixels to be predicted on the Key vector of the seed pixel consistent with the corresponding element in the first self-attention correlation tensor, thus preserving the influence of the Query vector of each of the pixels to be predicted on the Key vector of the seed pixel.

FIGS. 3a to 3d show schematic diagrams of the second mask according to some embodiments of the present disclosure.

As shown in FIG. 3a, the elements of a $1+n\times N^2$ column of the second mask are zero. The other elements of the second mask are less than a second threshold, wherein n is 0 or a positive integer, and N is the multiple of the resolution of the processed image sample to the resolution of the image sample to be processed. For example, the first threshold can be equal to the second threshold, both of which may be negative infinity, for example.

As shown in FIG. 3b, the elements of a $1+n\times N^2$ column of the second mask are zero, the diagonal elements of the second mask are 0, and the other elements of the second mask are less than the second threshold.

Figure 3C:
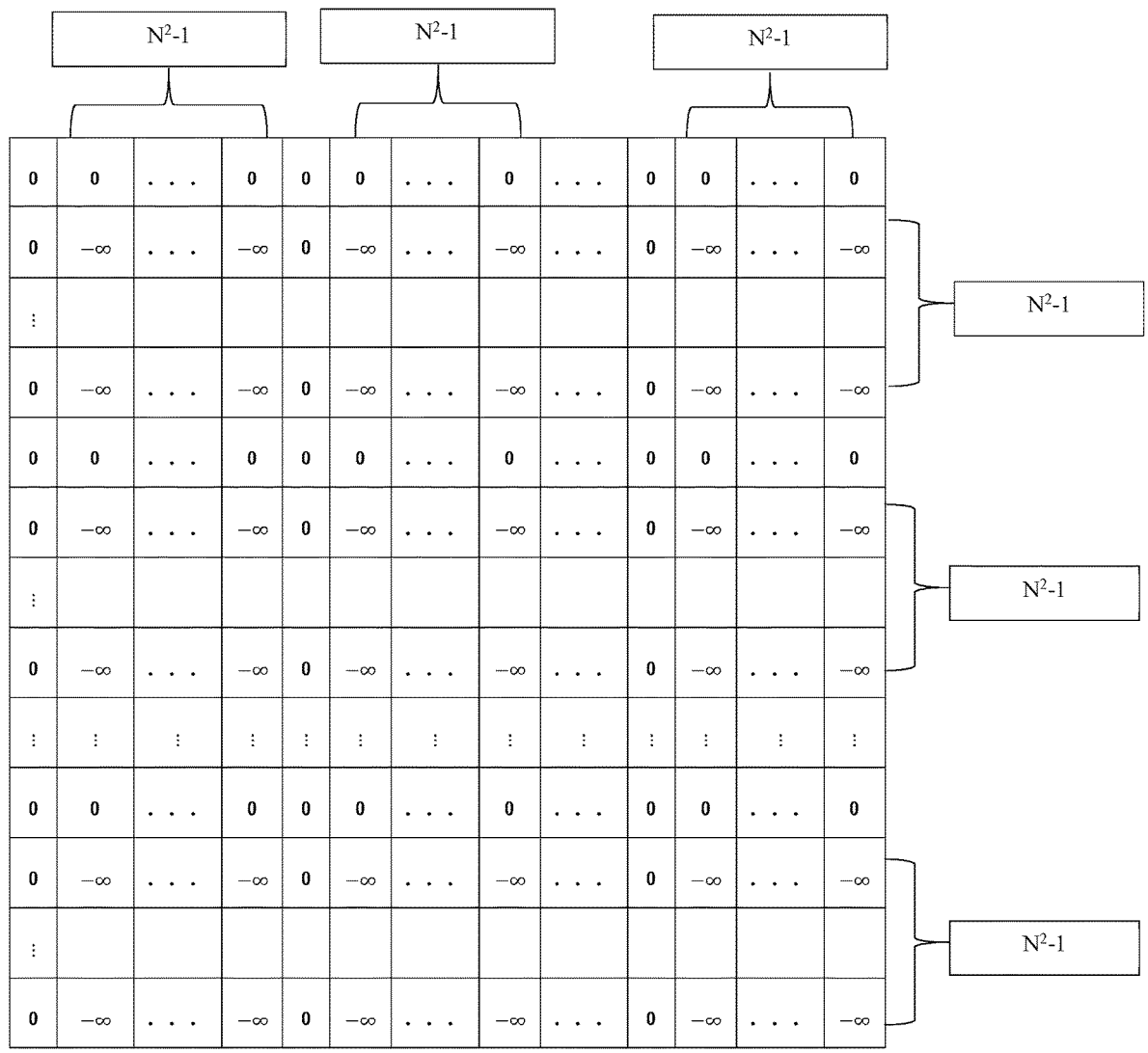

As shown in FIG. 3c, the elements of a $1+n\times N^2$ column of the second mask are zero, the elements of $1+n\times N^2$ row of the second mask are zero, and the other elements of the second mask are less than the second threshold.

Figure 3D:
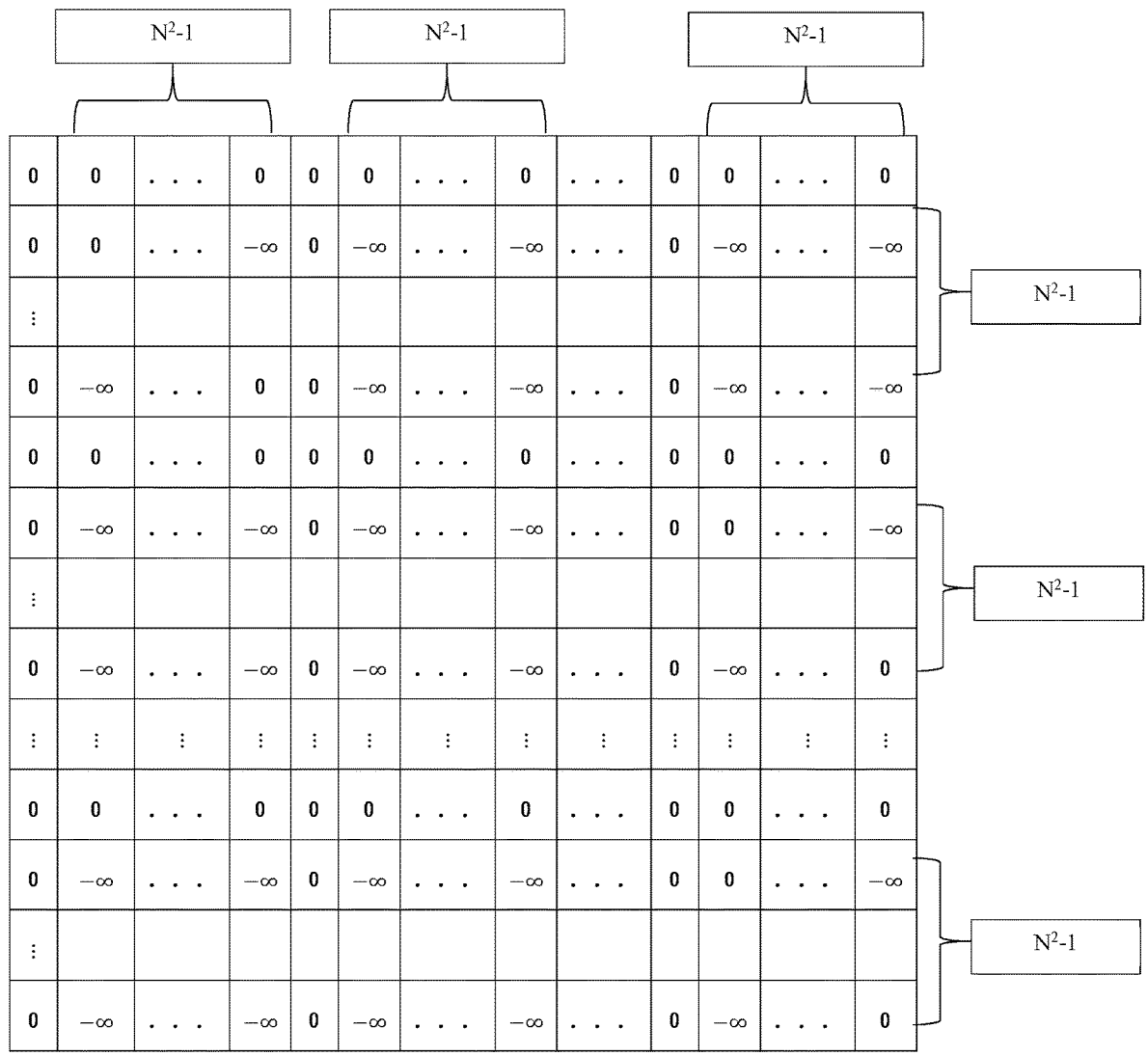

As shown in FIG. 3d, the elements of a $1+n\times N^2$ column of the second mask are zero, the elements of $1+n\times N^2$ row of the second mask are zero, the diagonal elements of the second mask are 0, and the other elements of the second mask are negative numbers less than the second threshold (for example, $-1\times 10^9$ or negative infinity).

In some embodiments, the first self-attention correlation tensor can be obtained using a machine learning model after one-dimensional embedding representation processing on the pixel block; Then, the second mask in FIG. 3a~3d can be used to process the first self-attention correlation tensor to obtain the second self-attention correlation tensor.

For example, it is also possible to obtain the first self-attention correlation tensor using a machine learning model after two-dimensional embedding representation processing on the pixel block; then, a second mask corresponding to the two-dimensional embedding representation processing can be used to process the first self-attention correlation tensor to obtain the second self-attention correlation tensor.

In some embodiments, the second self-attention correlation tensor is determined according to a sum of the second mask and the first self-attention correlation tensor, wherein an element corresponding to a first relevant relationship in the second mask is 0, and an element corresponding to a second relevant relationship is less than a second threshold (for example, negative infinity), the first relevant relationship being a relevant relationship between each of the pixels to be predicted and a seed element, and the second relevant relationship being a relevant relationship between each of the pixels to be predicted and a designated pixel of the pixels to be predicted.

For example, the first self-attention correlation tensor is added to the second mask to obtain the second self-attention correlation tensor. The second self-attention correlation tensor is scaled (that is, divided by $\sqrt{d}$) to prevent the data from being too large, which may otherwise lead to gradient disappearance or gradient explosion. The result is multiplied by the value vector after softmax processing. The output value of the self attention processing module (such as a self attention feature) is added to the input value of the self attention processing module, and the result is used as the output of the multi-head self attention module after layer normalization processing.

In some embodiments, the second self-attention correlation tensor is determined according to a subtraction result of the first self-attention correlation tensor and the second mask, wherein an element corresponding to a first relevant relationship in the second mask is 0, and an element corresponding to a second relevant relationship are greater than a second threshold (for example, these elements can be positive infinity).

In some embodiments, a feedforward neural network can be used to process the output of the multi-head self attention module; the processing result is then added to the output of the multi-head self attention module, and the result is used as the output of the whole encoder layer after layer normalization processing.

In some embodiments, if the number of training round is less than a round threshold, a self attention feature is extracted using the self attention module according to the second self-attention correlation tensor; if the number of training round is greater than or equal to the round threshold, a self attention feature is extracted using the self attention module according to the first self-attention correlation tensor.

For example, during the training process, the training can be divided into two stages. In the first stage (such as the first K rounds of training), the predicted pixel values are not accurate, and the second mask is used for training to improve the accuracy; in the second stage, the predicted pixels are relative accurate, and the second mask is not used for training. Each pixel learns from each other to improve the accuracy.

For example, in the whole training process, there can be only the first stage, only the second stage, or both the first and second stages.

Figure 4:
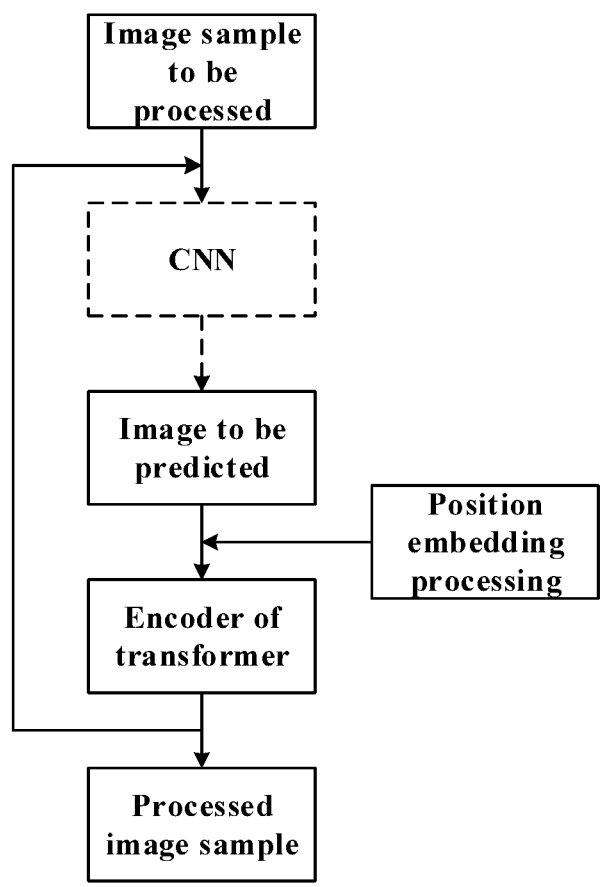
FIG. 4 shows a flowchart of a training method for a machine learning model according to other embodiments of the present disclosure.

FIG. 4 shows a flowchart of a training method for a machine learning model according to other embodiments of the present disclosure.

As shown in FIG. 4, a (CNN) convolution neural network can be used to extract features of an image sample to be processed to obtain an image to be predicted. It is also possible to use an image to be processed directly as an image to be predicted without using CNN for subsequent processing.

In some embodiments, pixels in the image can be position embedded. For example, a machine learning model is used to perform embedding representation processing on the pixels in the image to generate a first embedded feature tensor; feature information of the pixels in the image sample to be processed is extracted using the machine learning model according to the first embedded feature tensor. For example, the image can also be divided into a plurality of image blocks, and pixels in the image blocks can be position embedded as described above.

In some embodiments, the pixels in the image are position encoded to generate a position encoding tensor; the second embedded feature tensor is generated according to the position encoding tensor and the first embedded feature tensor; feature information of the pixels in the image sample to be processed is extracted using the machine learning model according to the second embedded feature tensor. According to the feature information, a processed image sample is obtained for training the machine learning model.

For example, the position encoding may be a one-dimensional position encoding, such as an absolute position encoding or a relative position encoding.

In some embodiments, for a first embedded feature tensor of mn×D, wherein D is the number of dimensions for embedding representation processing, the first D/2 dimensions of the first embedded feature tensor can be encoded in the X direction, and the second D/2 dimensions of the first embedded feature tensor can be encoded in the Y direction to obtain embedded feature sub-tensors Ex and Ey of mn×D/2, respectively; Ex and Ey are spliced together to form a position encoding representation Epos of mn×D;

For example, the X and Y directions are encoded as Ex and Ey respectively, both in size of mn×D. Ex is added to Ey form the position encoding representation Epos.

In this way, position information of pixels can be introduced into the prediction processing of the pixels through position encoding, so as to improve the accuracy of pixel prediction.

In step 140, the machine learning model is trained according to the prediction pixel values of the plurality of pixels to be predicted and labeled pixel values of the plurality of pixels to be predicted.

In some embodiments, the machine learning model can be trained using a MSE (mean square error) loss function or a cross entropy loss function.

In some embodiments, the resolution is increased by a factor of N after super-resolution processing, which can be divided into N1 and N2, i.e., N=N1×N2. Through replacing N in any of the above embodiments by N1 and N2 successively, and obtaining the same resolution by staged super-resolution processing and training, the problem of low processing efficiency caused by sparse tensors in the calculation process is avoided. For example, N can also be divided into more than two parts, that is, N=N1×N2 × . . . ×Nn. In this case, the processing is similar to that of the above embodiments.

In the above embodiment, a plurality of pixels to be predicted are used to expand the existing pixels in the image to be processed, and a machine learning model is used to predict the pixel values of these pixels to be predicted. In this way, information outside the receptive field can be learned, and the prediction process is a learning process, thus improving the accuracy of pixel prediction results and the performance of image super-resolution processing.

Figure 5:
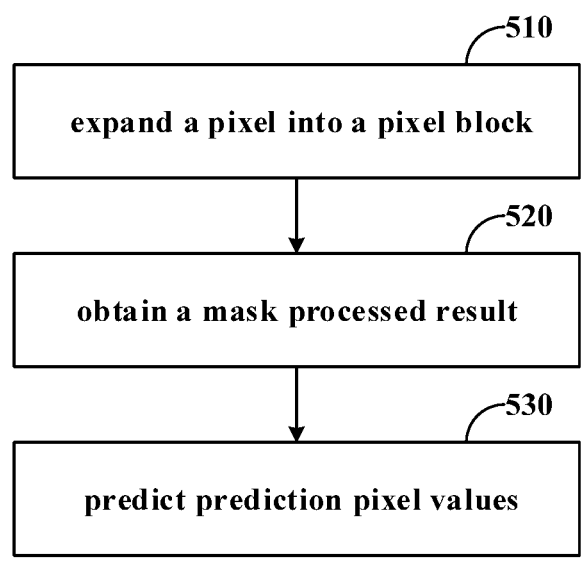
FIG. 5 shows a flowchart of an image processing method according to some embodiments of the present disclosure.

FIG. 5 shows a flowchart of an image processing method according to some embodiments of the present disclosure.

As shown in FIG. 5, in step 510, at least one pixel of an image sample to be processed is expanded into a pixel block, which comprises a plurality of pixels to be predicted.

In step 520, the pixel block is processed using a first mask to obtain a mask processed result.

In step 530, according to the mask processed result, prediction pixel values of the plurality of pixels to be predicted in the pixel block are predicted using a machine learning model to obtain a processed image sample, wherein the machine learning model is trained using the training method of any of the embodiments described above.

Figure 6:
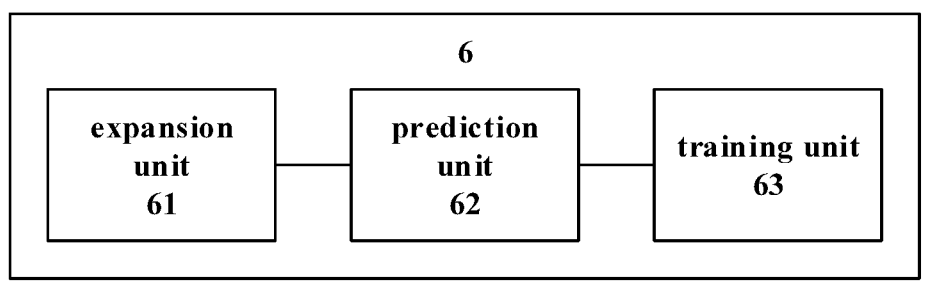
FIG. 6 shows a block diagram of an training apparatus for a machine learning model according to some embodiments of the present disclosure.

FIG. 6 shows a block diagram of an training apparatus for a machine learning model according to some embodiments of the present disclosure.

As shown in FIG. 6, the apparatus 6 for training a machine learning model comprises: an expansion unit 61 for expanding at least one pixel of an image sample to be processed into a pixel block, which comprises a plurality of pixels to be predicted, and processing the pixel block using a first mask to obtain a mask processed result; a prediction unit 62 for, according to the mask processed result, predicting prediction pixel values of the plurality of pixels to be predicted in the pixel block using a machine learning model to obtain a processed image sample; a training unit 63 for training the machine learning model according to the prediction pixel values of the plurality of pixels to be predicted and labeled pixel values of the plurality of pixels to be predicted.

In some embodiments, the prediction unit 62 is configured for extracting a self attention feature of the pixel block using a self attention module of the machine learning model; predicting the prediction pixel values according to the self attention feature of the pixel block using the machine learning model.

In some embodiments, the prediction unit 62 is configured for calculating a first self-attention correlation tensor of each of the pixels to be predicted using the self attention module; processing the first self-attention correlation tensor using a second mask to determine a second self-attention correlation tensor, wherein each of the pixels to be predicted do not learn relevant information of a designated pixel of the pixels to be predicted; according to the second self-attention correlation tensor, extracting a self attention feature using the self attention module.

In some embodiments, the prediction unit 62 is configured for extracting a Query vector and a Key vector of each of the pixels to be predicted using the self attention module; calculating the first self-attention correlation tensor according to the Query vector and the Key vector; processing the first self-attention correlation tensor using a second mask to determine a second self-attention correlation tensor comprises: processing the first self-attention correlation tensor using the second mask to determine the second self-attention correlation tensor, so that the influence of each of the pixels to be predicted on a designated pixel of the pixels to be predicted is less than a first threshold.

In some embodiments, at least one pixel described above is a seed pixel, and the seed pixel learn information thereof. The second self-attention correlation tensor causes that each of the pixels to be predicted only learn information of the seed pixel, or each of the pixels to be predicted learn information thereof and information of the seed pixel, or the seed pixel can learn information of each of the pixels to be predicted, and each of the pixels to be predicted only learn information of the seed pixel, or the seed pixel can learn information of each of the pixels to be predicted, and each of the pixels to be predicted only learn its own information and information of the seed pixel.

In some embodiments, the prediction unit 62 is configured for determining the second self-attention correlation tensor according to a sum of the second mask and the first self-attention correlation tensor, wherein an element corresponding to a first relevant relationship in the second mask is 0, and an element corresponding to a second relevant relationship is less than a second threshold, the first relevant relationship being a relevant relationship between each of the pixels to be predicted and at least one element, and the second relevant relationship being a relevant relationship between each of the pixels to be predicted and a designated pixel of the pixels to be predicted.

In some embodiments, the elements of a $1+n \times N^2$ column of the second mask are zero, and the other elements of the second mask are less than the second threshold, wherein n is 0 or a positive integer, N is a multiple of resolution of the processed image sample to resolution of the image sample to be processed; or the elements of a $1+n \times N^2$ column of the second mask are zero, the diagonal elements of the second mask are 0, and the other elements of the second mask are less than the second threshold; or the elements of a $1+n \times N^2$ column of the second mask are zero, the elements of $1+n \times N^2$ row of the second mask are zero, and other elements of the second mask are less than the second threshold; or the elements of a $1+n \times N^2$ column of the second mask are zero, the elements of $1+n \times N^2$ row of the second mask are zero, the diagonal elements of the second mask are 0, and the other elements of the second mask are less than the second threshold.

In some embodiments, the prediction unit 62 is configured for, if the number of training round is less than a round threshold, extracting the self attention feature using the self attention module according to the second self-attention correlation tensor; if the number of training round is greater than or equal to the round threshold, extracting the self attention feature using the self attention module according to the first self-attention correlation tensor.

In some embodiments, the prediction unit 62 is configured for performing embedding representation processing on the pixel block using the machine learning model to generate a first embedded feature tensor; extracting feature information of the pixel block using the machine learning model according to the first embedded feature tensor; predicting prediction pixel values using the machine learning model according to the feature information of the pixel block.

In some embodiments, the prediction unit 62 is configured for performing position encoding on pixels in the image sample to be processed to generate a position encoding tensor; generating the second embedded feature tensor according to the position encoding tensor and the first embedded feature tensor; extracting feature information of the pixels in the image sample to be processed using the machine learning model according to the second embedded feature tensor.

In some embodiments, the prediction unit 62 is configured for dividing the first embedded feature tensor into a plurality of embedded feature sub-tensors according to different directions; performing position encoding for the plurality of embedded feature sub-tensors respectively to generate a plurality of position encoded tensors.

In some embodiments, the expansion unit 61 is configured for dividing the image sample to be processed into a plurality of sub-images; expanding at least one pixel of the plurality of sub-images into a pixel block.

In some embodiments, the expansion unit 61 is configured for dividing the image to be processed into a plurality of image blocks; for different image channels, dividing each of the plurality of image blocks into a plurality of sub-images.

In some embodiments, different pixel blocks are processed using the same first mask having identical mask values; or different pixel blocks are processed using the same first mask having different mask values, or different pixel blocks are processed using different first masks each having identical mask values, or different pixel blocks are processed using different first masks each having different mask values.

Figure 7:
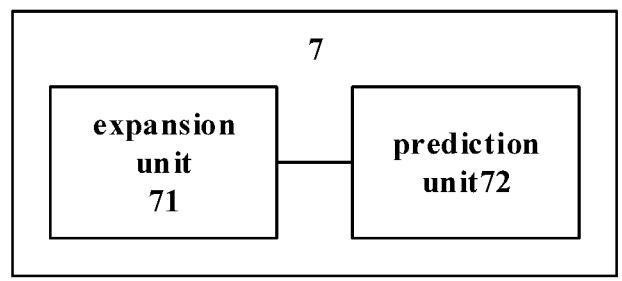
FIG. 7 shows a block diagram of an image processing apparatus according to some embodiments of the present disclosure.

FIG. 7 shows a block diagram of an image processing apparatus according to some embodiments of the present disclosure.

As shown in FIG. 7, the image processing apparatus 7 comprises: an expansion unit 71 for expanding at least one pixel of an image sample to be processed into a pixel block, which comprises a plurality of pixels to be predicted, and processing the pixel block using a first mask to obtain a mask processed result; a prediction unit 72 for, according to the mask processed result, predicting prediction pixel values of the plurality of pixels to be predicted in the pixel block using a machine learning model to obtain a processed image sample, wherein the machine learning model is trained using the training method of any of the embodiments described above.

Figure 8:
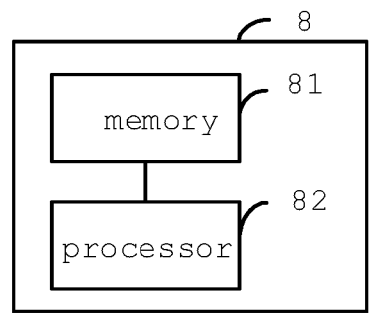
FIG. 8 shows a block diagram of an electronic device according to some embodiments of the present disclosure.

FIG. 8 shows a block diagram of an electronic device according to some embodiments of the present disclosure.

As shown in FIG. 8, the device 8 of this embodiment comprises: memory 81 and a processor 82 coupled to the memory 81, the processor 82 configured to, based on instructions stored in the memory 81, carry out the training method for a machine learning model or the image processing method described in any one of the embodiments of the present disclosure.

Wherein, the memory 81 may comprise, for example, system memory, a fixed non-transitory storage medium, or the like. The system memory stores, for example, an operating system, applications, a boot loader, a database, and other programs.

Figure 9:
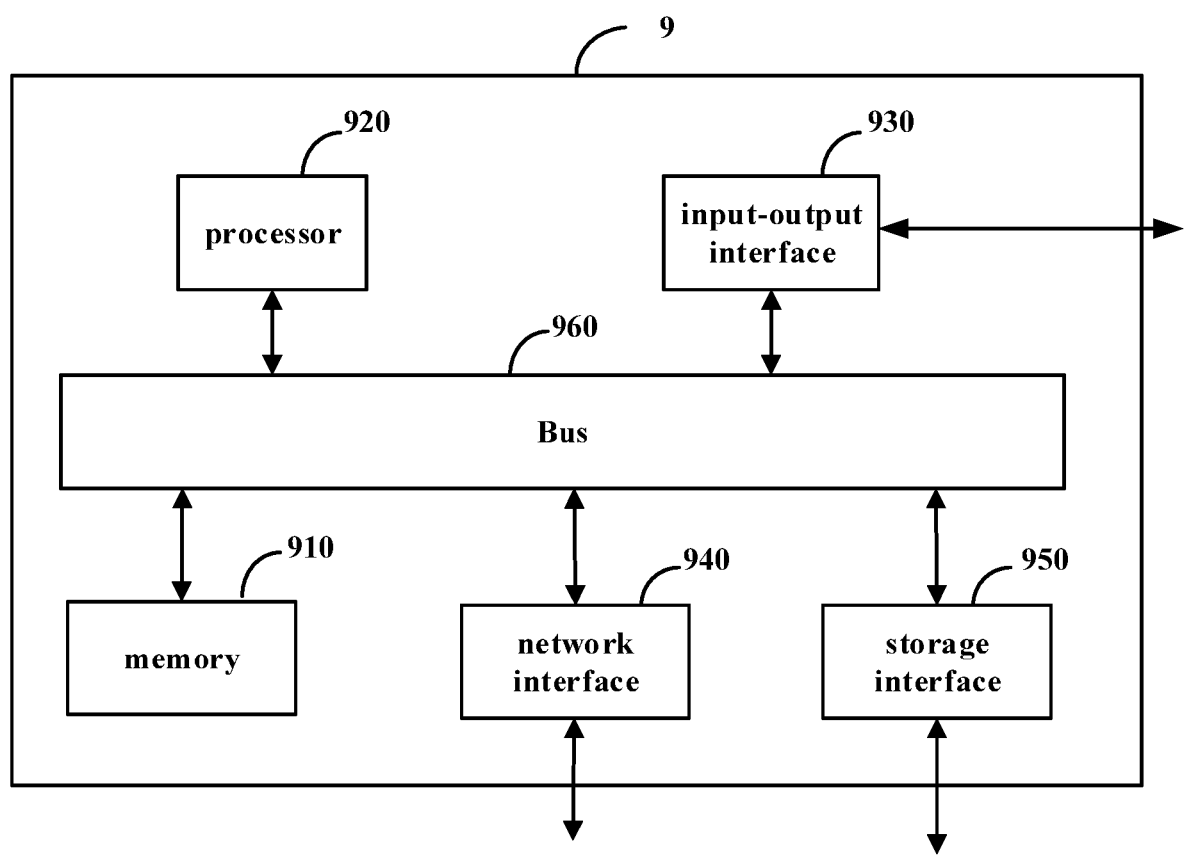
FIG. 9 shows a block diagram of an electronic device according to other embodiments of the present disclosure.

FIG. 9 shows a block diagram of an electronic device according to other embodiments of the present disclosure.

As shown in FIG. 9, the electronic device 9 of this embodiment comprises: memory 910 and a processor 920 coupled to the memory 910, the processor 920 configured to, based on instructions stored in the memory 910, carry out the training method for a machine learning model or the image processing method described in any one of the embodiments of the present disclosure.

The memory 910 may comprise, for example, system memory, a fixed non-transitory storage medium, or the like. The system memory stores, for example, an operating system, application programs, a boot loader, and other programs.

The electronic device 9 may further comprise an input-output interface 930, a network interface 940, a storage interface 950, and the like. These interfaces 930, 940, 950 and the memory 910 and the processor 920 may be connected to each other through a bus 960, for example. Wherein, the input-output interface 630 provides a connection interface for input-output devices such as a display, a mouse, a keyboard, a touch screen, a microphone, a loudspeaker, etc. The network interface 940 provides a connection interface for various networked devices. The storage interface 950 provides a connection interface for external storage devices such as an SD card and a USB flash disk.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

Heretofore, a training method for a machine learning model, an training apparatus for a machine learning model, an image processing method, an image processing apparatus, an electronic device, and a non-transitory computer-readable storage medium according to the present disclosure have been described in detail. In order to avoid obscuring the concepts of the present disclosure, some details known in the art are not described. Based on the above description, those skilled in the art can understand how to implement the technical solutions disclosed herein.

The method and system of the present disclosure may be implemented in many ways. For example, the method and system of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which comprise machine-readable instructions for implementing the method according to the present disclosure. Thus, the present disclosure also covers a recording medium storing programs for executing the method according to the present disclosure.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. A training method for a machine learning model, comprising:
   expanding at least one pixel of an image sample to be processed into a pixel block which comprises a plurality of pixels to be predicted;
   processing the pixel block using a first mask to obtain a mask processed result;
   predicting prediction pixel values of the plurality of pixels to be predicted using the machine learning model, according to the mask processed result; and
   training the machine learning model according to the prediction pixel values of the plurality of pixels to be predicted and labeled pixel values of the plurality of pixels to be predicted,
   wherein the predicting prediction pixel values of the plurality of pixels to be predicted using the machine learning model comprises:
   extracting a self attention feature of the pixel block using a self attention module of the machine learning model; and
   predicting the prediction pixel values using the machine learning model, according to the self attention feature of the pixel block.

2. The training method according to claim 1, wherein the extracting a self attention feature of the pixel block using a self attention module of the machine learning model comprises:
   calculating a first self-attention correlation tensor of each of the pixels to be predicted using the self attention module;
   processing the first self-attention correlation tensor using a second mask to determine a second self-attention correlation tensor, wherein each of the pixels to be predicted do not learn relevant information of a designated pixel of the pixels to be predicted; and extracting the self attention feature using the self attention module, according to the second self-attention correlation tensor.

3. The training method according to claim 2, wherein the calculating a first self attention correlation tensor of each of the pixels to be predicted using the self attention module comprises:
　extracting a Query vector and a Key vector of each of the pixels to be predicted using the self attention module; and
　calculating the first self-attention correlation tensor according to the Query vector and the Key vector;
　wherein the processing the first self-attention correlation tensor using a second mask to determine a second self-attention correlation tensor comprises:
　processing the first self-attention correlation tensor using the second mask to determine the second self-attention correlation tensor, wherein influence of each of the pixels to be predicted on the designated pixel of the pixels to be predicted is less than a first threshold.

4. The training method according to claim 3, wherein the at least one pixel is a seed pixel, and the second self-attention correlation tensor causes that:
　each of the pixels to be predicted only learn information of the seed pixel; or
　each of the pixels to be predicted learn information thereof and information of the seed pixel; or
　the seed pixel can learn information of each of the pixels to be predicted, and each of the pixels to be predicted only learn information of the seed pixel; or
　the seed pixel can learn information of each of the pixels to be predicted, and each of the pixels to be predicted only learn its own information and information of the seed pixel.

5. The training method according to claim 3, wherein the processing the first self attention correlation tensor using a second mask to determine a second self-attention correlation tensor comprises:
　determining the second self-attention correlation tensor according to a sum of the second mask and the first self-attention correlation tensor, wherein an element corresponding to a first relevant relationship between each of the pixels to be predicted and the at least one element in the second mask is 0, and an element corresponding to a second relevant relationship between each of the pixels to be predicted and the designated pixel of the pixels to be predicted is less than a second threshold.

6. The training method according to claim 5, wherein:
　elements of a $1+n \times N^2$ column of the second mask are zero, and other elements of the second mask are less than the second threshold, n being 0 or a positive integer, and N being a multiple of resolution of a processed image sample which is obtained according to the prediction pixel values to resolution of the image sample to be processed; or
　the elements of a $1+n \times N^2$ column of the second mask are zero, diagonal elements of the second mask are 0, and other elements of the second mask are less than the second threshold; or
　the elements of a $1+n \times N^2$ column of the second mask are zero, elements of $1+n \times N^2$ row of the second mask are zero, and other elements of the second mask are less than the second threshold; or
　the elements of a $1+n \times N^2$ column of the second mask are zero, the elements of $1+n \times N^2$ row of the second mask are zero, the diagonal elements of the second mask are 0, and other elements of the second mask are negative numbers less than the second threshold.

7. The training method according to claim 2, wherein the extracting a self attention feature of the pixel block using a self attention module of the machine learning model comprises:
　extracting the self attention feature using the self attention module according to the second self-attention correlation tensor, in a case that a number of training round is less than a round threshold; and
　extracting the self attention feature using the self attention module according to the first self-attention correlation tensor, in a case that a number of training round is greater than or equal to the round threshold.

8. The training method according to claim 1, wherein the predicting prediction pixel values of the plurality of pixels to be predicted using a machine learning model comprises:
　performing embedding representation processing on the pixel block using the machine learning model to generate a first embedded feature tensor;
　extracting feature information of the pixel block using the machine learning model according to the first embedded feature tensor; and
　predicting the prediction pixel values according to the self attention feature of the pixel block using the machine learning model.

9. The training method according to claim 8, wherein the extracting feature information of the pixel block using the machine learning model according to the first embedded feature tensor comprises:
　performing position encoding on pixels in the image sample to be processed to generate a position encoding tensor;
　generating a second embedded feature tensor according to the position encoding tensor and the first embedded feature tensor; and
　extracting feature information of the pixels in the image sample to be processed using the machine learning model according to the second embedded feature tensor.

10. The training method according to claim 9, wherein the performing position encoding for the first embedded feature tensor to generate a position encoding tensor comprises:
　dividing the first embedded feature tensor into a plurality of embedded feature sub-tensors according to different directions; and
　performing position encoding for the plurality of embedded feature sub-tensors respectively to generate a plurality of position encoded tensors.

11. The training method according to claim 1, wherein the expanding at least one pixel of an image sample to be processed into a pixel block comprises:
　dividing the image sample to be processed into a plurality of sub-images; and
　expanding at least one pixel of the plurality of sub-images into a pixel block.

12. The training method according to claim 11, wherein the dividing the image sample to be processed into a plurality of sub-images comprises:
　dividing the image to be processed into a plurality of image blocks; and
　dividing each of the plurality of image blocks into a plurality of sub-images, for different image channels.

13. The training method according to claim 1, wherein:
　different pixel blocks are processed using a same first mask having identical mask values; or different pixel blocks are processed using a same first mask having different mask values; or different pixel blocks are processed using different first masks each having identical mask values; or different pixel blocks are processed using different first masks each having different mask values.

14. An image processing method, comprising:

expanding at least one pixel of an image to be processed into a pixel block, which comprises a plurality of pixels to be predicted;

processing the pixel block using a first mask to obtain a mask processed result; and predicting prediction pixel values of the plurality of pixels to be predicted in the pixel block using a machine learning model to obtain a processed image, according to the mask processed result, wherein the machine learning model is trained using the training method of claim 1.

15. An electronic device, comprising:
memory; and
a processor coupled to the memory, the processor configured to, based on instructions stored in the memory, carry out the training method for the machine learning model of claim 1.

16. A non-transitory computer-readable storage medium on which a computer program is stored, which when executed by a processor implements the training method for the machine learning model of claim 1.

17. An electronic device, comprising:
memory; and
a processor coupled to the memory, the processor configured to, based on instructions stored in the memory, carry out the image processing method of claim 14.

18. A non-transitory computer-readable storage medium on which a computer program is stored, which when executed by a processor implements the image processing method of claim 14.

* * * * *